United States Patent
Cho et al.

(10) Patent No.: US 10,105,906 B2
(45) Date of Patent: Oct. 23, 2018

(54) STRUCTURED LIGHT GENERATING DEVICE AND MEASURING SYSTEM AND METHOD

(71) Applicant: INDUSTRIAL TECHNOLOGY RESEARCH INSTITUTE, Hsinchu Hsien (TW)

(72) Inventors: Chia-Hung Cho, Hsinchu (TW); Hsin-Yi Chen, Hsinchu (TW); Yi-Chen Hsieh, Hsinchu (TW); Cheng-Ta Mu, Hsinchu (TW)

(73) Assignee: INDUSTRIAL TECHNOLOGY RESEARCH INSTITUTE, Hsinchu Hsien (TW)

( * ) Notice: Subject to any disclaimer, the term of this patent is extended or adjusted under 35 U.S.C. 154(b) by 246 days.

(21) Appl. No.: 14/935,601

(22) Filed: Nov. 9, 2015

(65) Prior Publication Data
US 2017/0066192 A1    Mar. 9, 2017

(30) Foreign Application Priority Data
Sep. 8, 2015    (TW) .............................. 104129620 A

(51) Int. Cl.
*H04N 7/18*    (2006.01)
*B29C 67/00*    (2017.01)
(Continued)

(52) U.S. Cl.
CPC ........ *B29C 67/0088* (2013.01); *B29C 64/153* (2017.08); *B29C 64/20* (2017.08);
(Continued)

(58) Field of Classification Search
CPC ........................ G01B 11/2513; B29C 67/0088
(Continued)

(56) References Cited

U.S. PATENT DOCUMENTS

| 7,609,865 B2 | 10/2009 | Chen |
| 8,830,309 B2 | 9/2014 | Rohaly et al. |
(Continued)

FOREIGN PATENT DOCUMENTS

| CN | 1857930 | 11/2006 |
| CN | 101957183 | 1/2011 |
(Continued)

OTHER PUBLICATIONS

Hu, et al. "Sensing, modeling and control for laser-based additive manufacturing". International Journal of Machine Tools and Manufacture 43, 2003, pp. 51-60.
(Continued)

*Primary Examiner* — Richard Torrente
(74) *Attorney, Agent, or Firm* — Amin, Turocy & Watson LLP

(57) ABSTRACT

A structured light generating device and a measuring system and method are provided. The structured light generating device includes: a light modulating element for receiving a projection light beam and modulating the projection light beam into a first structured light beam having a pattern, and a light shifting element corresponding to the light modulating element for receiving and shifting the first structured light beam to generate a second structured light beam having the pattern. A shift difference is formed between the first structured light beam and the second structured light beam, and the first structured light beam and the second structured light beam are superimposed to form a superimposed structured light beam so as to improve resolution.

19 Claims, 9 Drawing Sheets

(51) Int. Cl.
    *G02B 27/10*     (2006.01)
    *B33Y 50/02*     (2015.01)
    *G01B 11/25*     (2006.01)
    *B29C 64/153*     (2017.01)
    *B29C 64/20*     (2017.01)
    *B29C 64/386*     (2017.01)
    *G03B 21/00*     (2006.01)

(52) U.S. Cl.
    CPC ............ *B29C 64/386* (2017.08); *B33Y 50/02* (2014.12); *G01B 11/2513* (2013.01); *G01B 11/2527* (2013.01); *G02B 27/10* (2013.01); *G03B 21/005* (2013.01)

(58) Field of Classification Search
    USPC .......................................................... 348/135
    See application file for complete search history.

(56) References Cited

U.S. PATENT DOCUMENTS

| | | | | |
|---|---|---|---|---|
| 2007/0115484 | A1* | 5/2007 | Huang | G01B 11/2527 356/604 |
| 2010/0007896 | A1 | 1/2010 | Fishbaine | |
| 2010/0225985 | A1* | 9/2010 | Fukumoto | G11B 7/083 359/32 |
| 2012/0133928 | A1* | 5/2012 | Urano | G01N 21/9501 356/237.2 |
| 2014/0036034 | A1 | 2/2014 | Boyer et al. | |
| 2014/0065194 | A1* | 3/2014 | Yoo | B29C 67/0081 424/400 |
| 2015/0054918 | A1 | 2/2015 | Lee et al. | |
| 2015/0061170 | A1 | 3/2015 | Engel et al. | |
| 2015/0174828 | A1* | 6/2015 | Creuzer | B29C 67/0088 264/40.1 |
| 2015/0304616 | A1* | 10/2015 | Tada | H04N 9/3191 348/189 |

FOREIGN PATENT DOCUMENTS

| | | |
|---|---|---|
| CN | 102147239 | 8/2011 |
| TW | 201317621 | 5/2013 |
| TW | M492012 | 12/2014 |

OTHER PUBLICATIONS

Taiwanese Office Action for Taiwanese Patent Application No. 104129620 dated Aug. 16, 2016.

* cited by examiner

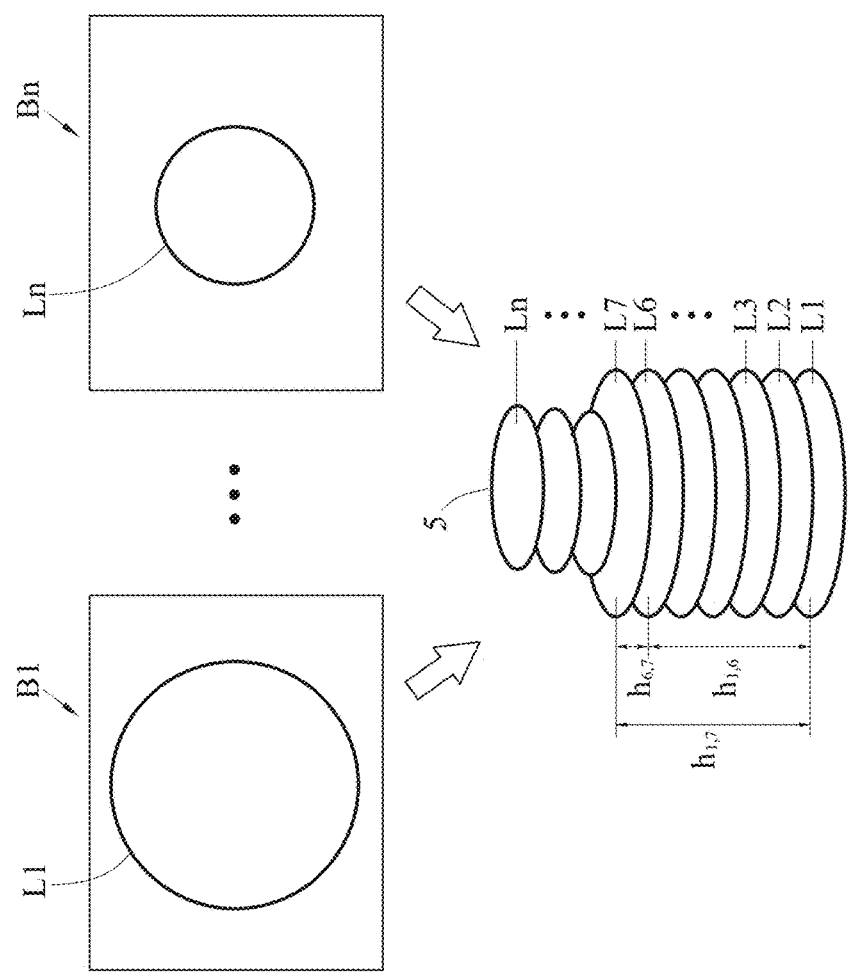

STRUCTURED LIGHT GENERATING DEVICE AND MEASURING SYSTEM AND METHOD

CROSS-REFERENCE TO RELATED APPLICATION

The present disclosure is based on, and claims priority from Taiwan Application Serial Number 104129620, filed on Sep. 8, 2015, and the disclosure of which is hereby incorporated by reference herein in its entirety.

TECHNICAL FIELD

The present disclosure relates to a structured light generating device and a measuring system and method.

BACKGROUND 3D printing is quite popular nowadays, which fabricates a 3D object by superimposing 2D patterns layer by layer.

Since the process for fabricating a 3D object is time-consuming and has low precision and repeatability nowadays, a measuring system is required to measure topography of each layer in two dimensions and variation of height in a third dimension so as to ensure the quality of the 3D object.

However, due to an insufficient resolution of a current available measuring system, it is difficult to monitor the topography and height variation of the 3D object and measure flatness of spread powder on a measuring surface (2D) of the 3D object, which adversely affects the quality and yield of the 3D object.

Further, in order to fabricate a 3D object having N layers, a current available measuring system generally performs 2N operations to capture images of N measuring surfaces and N reference surfaces, thereby obtaining the height variation of each layer of the object.

Furthermore, an image defect algorithm such as singular value decomposition (SVD) or Hilbert-Huang transform (HHT) is usually used to analyze the flatness of spread powder on the 3D object, which requires a large number of data operations to obtain background information and defective images.

SUMMARY

A structured light generating device according to an embodiment of the present disclosure comprises a light modulating element configured to receive a projection light beam and modulate the projection light beam into a first structured light beam having a pattern; and a light shifting element corresponding to the light modulating element and configured to receive and shift the first structured light beam to generate a second structured light beam having the pattern, wherein a shift difference exists between the first structured light beam and the second structured light beam, and the first structured light beam and the second structured light beam are superimposed to form a superimposed structured light beam.

A measuring system according to an embodiment of the present disclosure comprises a structured light generating device and an image capturing device. The structured light generating device comprises: a light modulating element configured to receive a projection light beam and modulate the projection light beam into a first structured light beam having a pattern; and a light shifting element corresponding to the light modulating element and configured to receive and shift the first structured light beam to generate a second structured light beam having the pattern, wherein a shift difference exists between the first structured light beam and the second structured light beam, and the first structured light beam and the second structured light beam are superimposed to form a superimposed structured light beam for being projected onto an object to be measured. The image capturing device is configured to capture a structured light image presented by the superimposed structured light beam on the object.

A measuring method according to an embodiment of the present disclosure comprises: providing a measuring system comprising a structured light generating device and an image capturing device, wherein the structured light generating device has a light modulating element and a corresponding light shifting element; receiving and modulating, by the light modulating element, a projection light beam into a first structured light beam having a pattern; receiving and shifting, by the light shifting element, the first structured light beam to generate a second structured light beam having the pattern, wherein a shift difference exists between the first structured light beam and the second structured light beam, and the first structured light beam and the second structured light beam are superimposed to form a superimposed structured light beam for being projected onto an object to be measured. The image capturing device captures a structured light image presented by the superimposed structured light beam on the object.

A light modulating element according to an embodiment of the present disclosure modulates a projection light beam into a first structured light beam having a pattern, and a light shifting element shifts the first structured light beam to generate a second structured light beam having the pattern. The first structured light beam and the second structured light beam are superimposed to form a superimposed structured light beam, thereby improving the resolution.

A structured light generating device according to an embodiment of the present disclosure can be used to measure an object (3D object) fabricated by a 3D printing device. In one embodiment, height variation of each layer of the object or flatness of spread powder on the object can be analyzed through the superimposed structured light beam so as to improve the quality and yield of the object.

BRIEF DESCRIPTION OF DRAWINGS

FIGS. 3A and 3B are schematic diagrams showing a first structured light beam, a second structured light beam and a superimposed structured light beam according to the present disclosure, wherein FIG. 3B shows enlarged views of portions of the first and second structured light beams in a region R indicated by a dotted boundary line in FIG. 3A;

FIGS. 5A-5B, 6 and 7 are schematic diagrams showing measurement of height variation of an object by the measuring system having the structured light generating device according to the present disclosure, wherein FIG. 5A is a partial view of FIG. 4; FIG. 5B is a partial view of FIG. 5A;

and FIGS. 6 and 7 show different methods for calculating the height variation of the object;

FIGS. 8, 9A and 9B are schematic diagrams showing measurement of flatness of spread powder on the object by the measuring system having the structured light generating device according to the present disclosure, wherein FIG. 8 is a partial view of FIG. 4, and FIGS. 9A and 9B show different structured light images presented by a superimposed structured light beam on the object.

DETAILED DESCRIPTION

The following illustrative embodiments are provided to illustrate the present disclosure. These and other advantages and effects can be apparent to those in the art after reading this specification. It should be noted that all the drawings are not intended to limit the present disclosure. Various modifications and variations can be made without departing from the spirit of the present disclosure.

Figure 1:
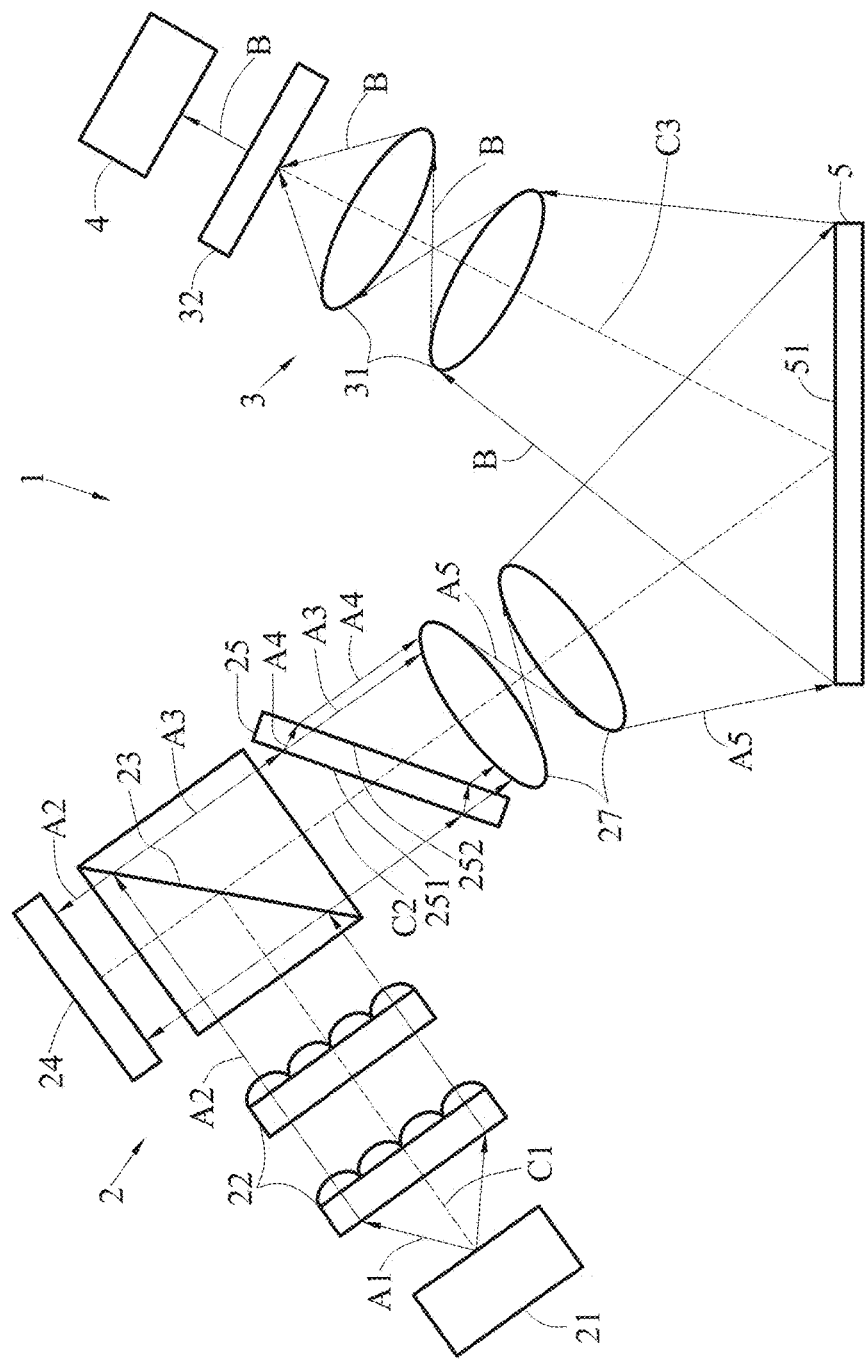
FIG. 1 is a schematic diagram of a measuring system having a structured light generating device according to an embodiment of the present disclosure.
Figure 2:
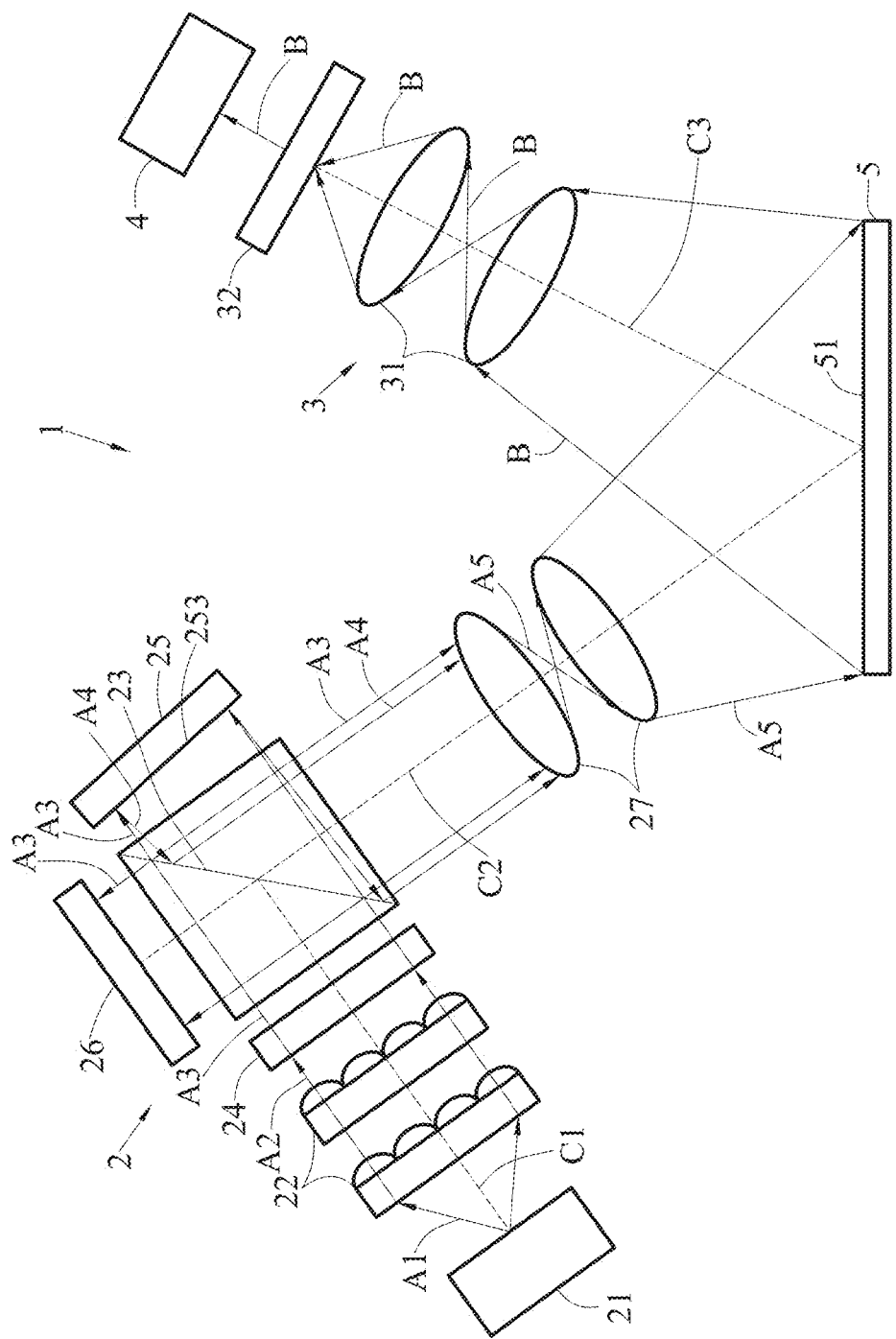
FIG. 2 is a schematic diagram of a measuring system having a structured light generating device according to another embodiment of the present disclosure.
Figure 3B:
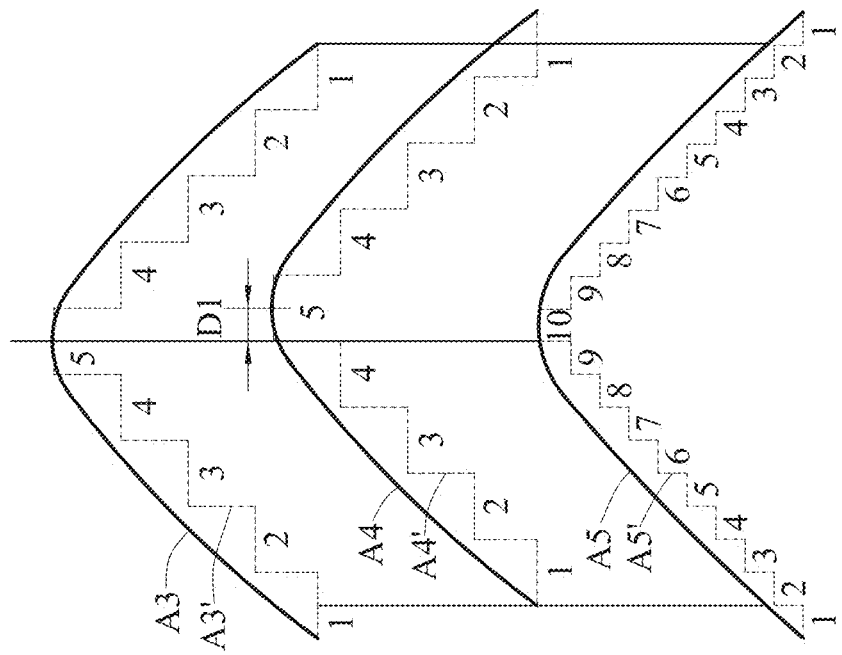
Figure 3A:
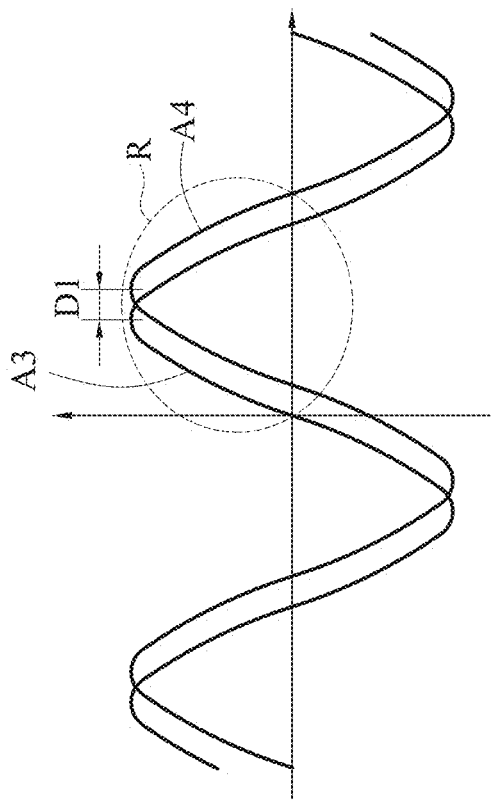

FIG. 1 is a schematic diagram of a measuring system 1 having a structured light generating device 2 according to an embodiment of the present disclosure. FIG. 2 is a schematic diagram of a measuring system 1 having a structured light generating device 2 according to another embodiment of the present disclosure. FIGS. 3A and 3B are schematic diagrams showing a first structured light beam A3, a second structured light beam A4 and a superimposed structured light beam A5 according to the present disclosure, wherein FIG. 3B shows enlarged views of portions of the first structured light beam A3 and the second structured light beam A4 in a region R indicated by a dotted boundary line in FIG. 3A.

Referring to FIG. 1 or FIG. 2, a measuring system 1 has a structured light generating device 2, an image capturing device 3 and a computing device 4. The structured light generating device 2 has a light modulating element 24 (e.g., a light intensity modulating element) and a light shifting element 25. The light modulating element 24 receives a projection light beam A2 and modulates the projection light beam A2 into a first structured light beam A3 having a pattern. The light shifting element 25 corresponds to the light modulating element 24 to receive and shift the first structured light beam A3 so as to generate a second structured light beam A4 having the pattern.

Figure 9A:
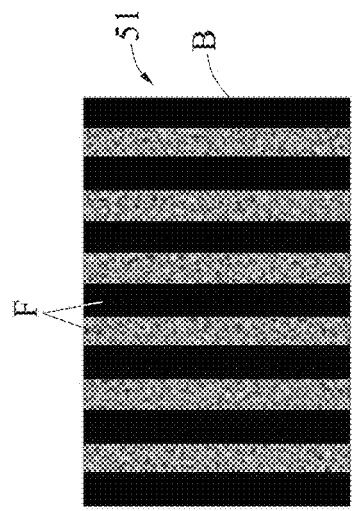

Referring to FIG. 1 or FIG. 2, the light modulating element 24 can be a digital micro-mirror device (DMD), a liquid crystal on silicon (LCOS) element or a grating. The light shifting element 25 can be a transparent plate or a glass plate (as shown in FIG. 1), a reflecting mirror (as shown in FIG. 2), or a double refracting crystal. The pattern of the first structured light beam A3 and the second structured light beam A4 is a stripe pattern F (as shown in FIG. 9A), a checkerboard pattern or a dot array pattern. The computing device 4 can be a computer, an ALU (Arithmetic Logic Unit), a CPU (Central Processing Unit) or a processor.

Referring to FIGS. 3A and 3B, a shift difference D1 is formed between the first structured light beam A3 and the second structured light beam A4, and the first structured light beam A3 and the second structured light beam A4 are superimposed to form a superimposed structured light beam A5. Further, the first structured light beam A3, the second structured light beam A4 and the superimposed structured light beam A5 can be a digital structured light beam A3', a digital structured light beam A4' and a digital superimposed structured light beam A5', respectively.

For example, referring to FIG. 3A, the first structured light beam A3 and the second structured light beam A4 have sine waveforms. Referring to FIG. 3B, each of the first digital structured light beam A3' and the second digital structured light beam A4' has nine pixels with different intensities (from 1 to 5 to 1). The shift difference D1 between the first digital structured light beam A3' and the second digital structured light beam A4' can be less than one pixel. For example, the shift difference D1 between the first digital structured light beam A3' and the second digital structured light beam A4' is 0.5 pixel. The first digital structured light beam A3' and the second digital structured light beam A4' are superimposed to form the superimposed structured light beam A5'. As such, the superimposed structured light beam A5' has 19 pixels with different intensities (from 1 to 10 to 1), thereby improving the resolution.

Referring to FIG. 1 or FIG. 2, the structured light generating device 2 further has a light emitting element 21 and a corresponding light uniformizing module 22. The light emitting element 21 emits a light beam A1 according to an optical axis C1 and the light uniformizing module 22 uniformly transforms the light beam A1 into the projection light beam A2. The light beam A1 can be an infrared light beam, a visible light beam or a single wavelength laser light beam.

Referring to FIG. 1, the structured light generating device 2 further has a beam splitter 23 corresponding to the light uniformizing module 22 and positioned between the light modulating element 24 and the light shifting element 25 (such as a glass plate). The beam splitter 23 receives the projection light beam A2 from the light uniformizing module 22 and reflects the projection light beam A2 into the light modulating element 24 according to an optical axis C2 perpendicular to the optical axis C1. The light modulating element 24 modulates the projection light beam A2 into the first structured light beam A3 and reflects the first structured light beam A3. As such, the first structured light beam A3 transmits through the beam splitter 23 and reaches an incident surface 251 of the light shifting element 25, and the light shifting element 25 shifts the first structured light beam A3 to generate the second structured light beam A4.

In one embodiment, as shown in FIG. 1, the incident surface 251 of the light shifting element 25 is not perpendicular to the first structured light beam A3 from the light modulating element 24 (or the beam splitter 23). A small angle (less than 30 degrees, for example) is formed between the first structured light beam A3 and the second structured light beam A4 inside the light shifting element 25. The first structured light beam A3 and the second structured light beam A4 on a light emitting surface 252 of the light shifting element 25 are parallel to one another and have a shift difference D1 therebetween, as shown in FIGS. 3A and 3B, and the first structured light beam A3 and the second structured light beam A4 are superimposed to form the superimposed structured light beam A5.

Referring to FIG. 1, the structured light generating device 2 further has a focusing lens group 27 corresponding to the light shifting element 25 for focusing the superimposed structured light beam A5 on a measuring surface 51 of an object 5 to be measured.

In another embodiment, referring to FIG. 2, the structured light generating device 2 has a beam splitter 23 positioned between the light modulating element 24 and the light shifting element 25 (such as a reflecting mirror), and the light modulating element 24 corresponds to the light uniformizing module 22. A portion of the first structured light beam A3 from the light modulating element 24 transmits through the beam splitter 23 and reaches a reflecting surface 253 of the light shifting element 25, and the light shifting element 25 shifts the first structured light beam A3 to generate the second structured light beam A4.

In one embodiment, as shown in FIG. 2, the reflecting surface 253 of the light shifting element 25 is not perpendicular to the first structured light beam A3 from the light modulating element 24 (or the beam splitter 23). The first structured light beam A3 is reflected by the reflecting surface 253 to generate the second structured light beam A4, and a small angle (less than 30 degrees, for example) is formed between the first structured light beam A3 and the second structured light beam A4 on the reflecting surface 253. The second structured light beam A4 from the reflecting surface 253 is further reflected by the beam splitter 23.

Referring to FIG. 2, the structured light generating device 2 further has a reflecting mirror 26 corresponding to the beam splitter 23 for receiving another portion of the first structured light beam A3 from the beam splitter 23 and reflecting the first structured light beam A3. As such, the first structured light beam A3 transmits through the beam splitter 23. The first structured light beam A3 reflected by the reflecting mirror 26 and the second structured light beam A4 reflected by the beam splitter 23 are parallel to one another and have a shift difference D1 therebetween, as shown in FIGS. 3A and 3B, and the first structured light beam A3 and the second structured light beam A4 are superimposed to form the superimposed structured light beam A5.

Referring to FIG. 2, the structured light generating device 2 further has a focusing lens group 27 corresponding to the beam splitter 23 for focusing the superimposed structured light beam A5 from the beam splitter 23 on a measuring surface 51 of an object 5 to be measured.

Further, referring to FIG. 1 or FIG. 2, according to an optical axis C3, the image capturing device 3 captures a structured light image B (for example, a two-dimensional structured light image) presented by the superimposed structured light beam A5 on the measuring surface 51 of the object 5. An angle of about 60 degrees is formed between the optical axis C2 of the structured light generating device 2 and the optical axis C3 of the image capturing device 3. The structured light generating device 2 and the image capturing device 3 can (1) project light perpendicularly and capture image obliquely, (2) project light obliquely and capture image perpendicularly, or (3) project light obliquely and capture image obliquely. The image capturing device 3 has a lens group 31 and a corresponding sensing element 32 for capturing the structured light image B of the object 5. The sensing element 32 can be a photosensitive element or a photosensitive element array.

Figure 4:
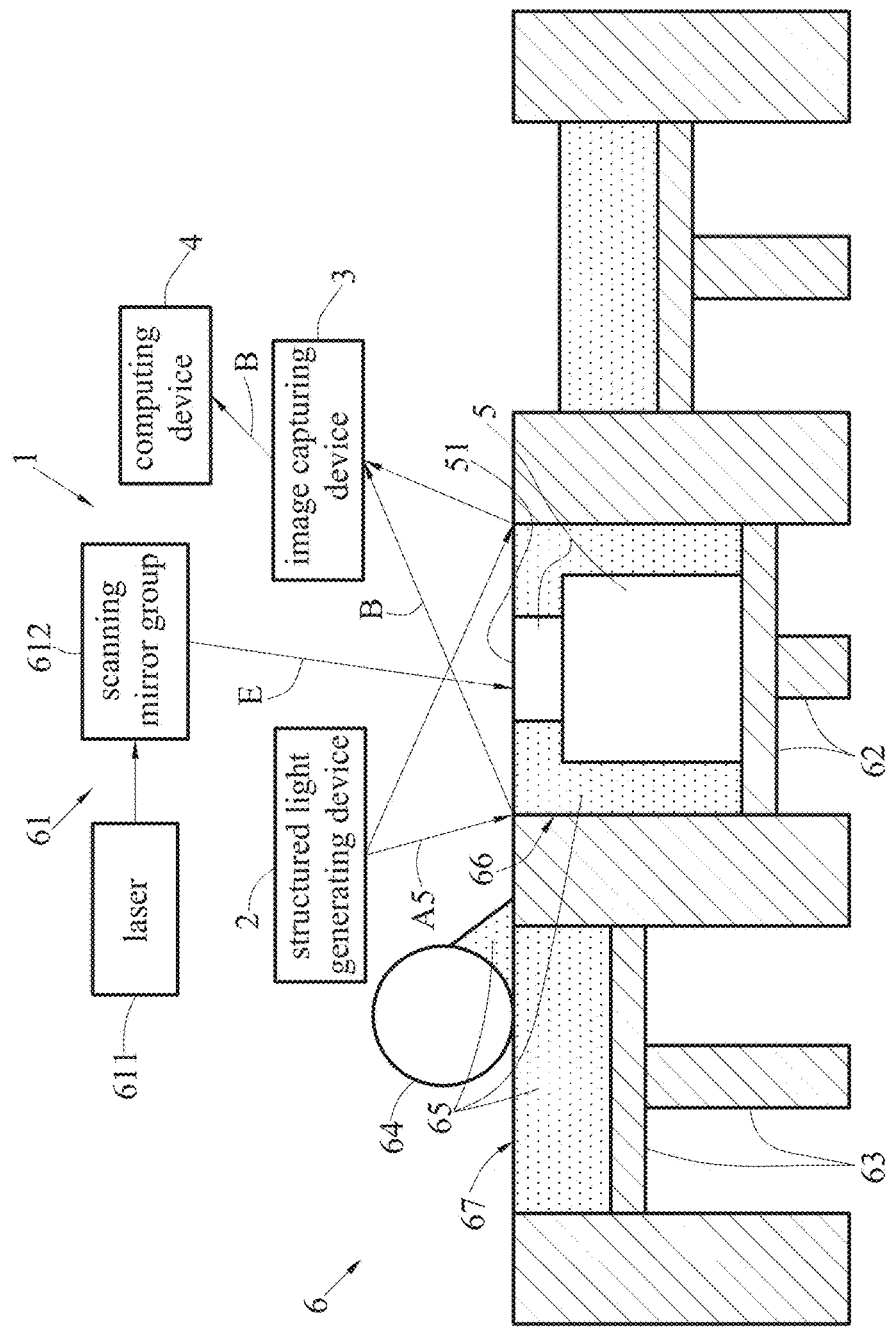
FIG. 4 is a schematic diagram showing application of the measuring system having the structured light generating device of the present disclosure to a 3D printing device.
Figure 5A:
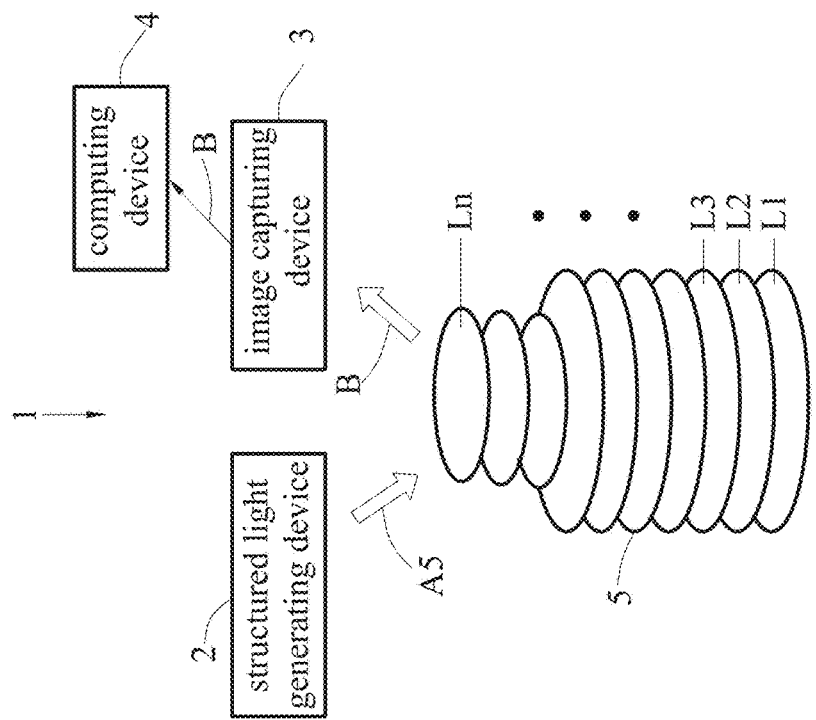
Figure 5B:
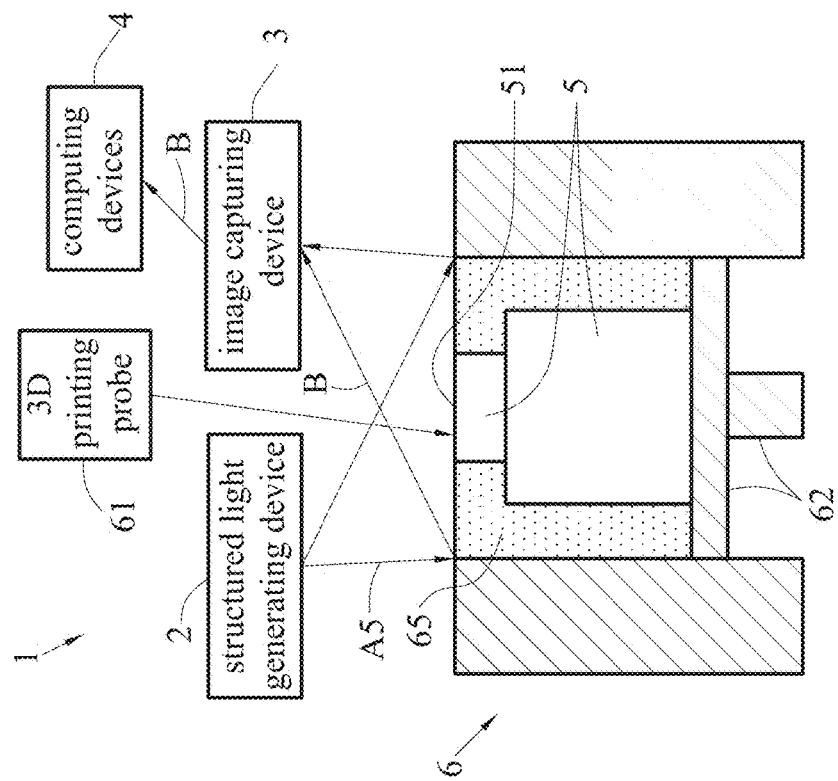
Figure 6:
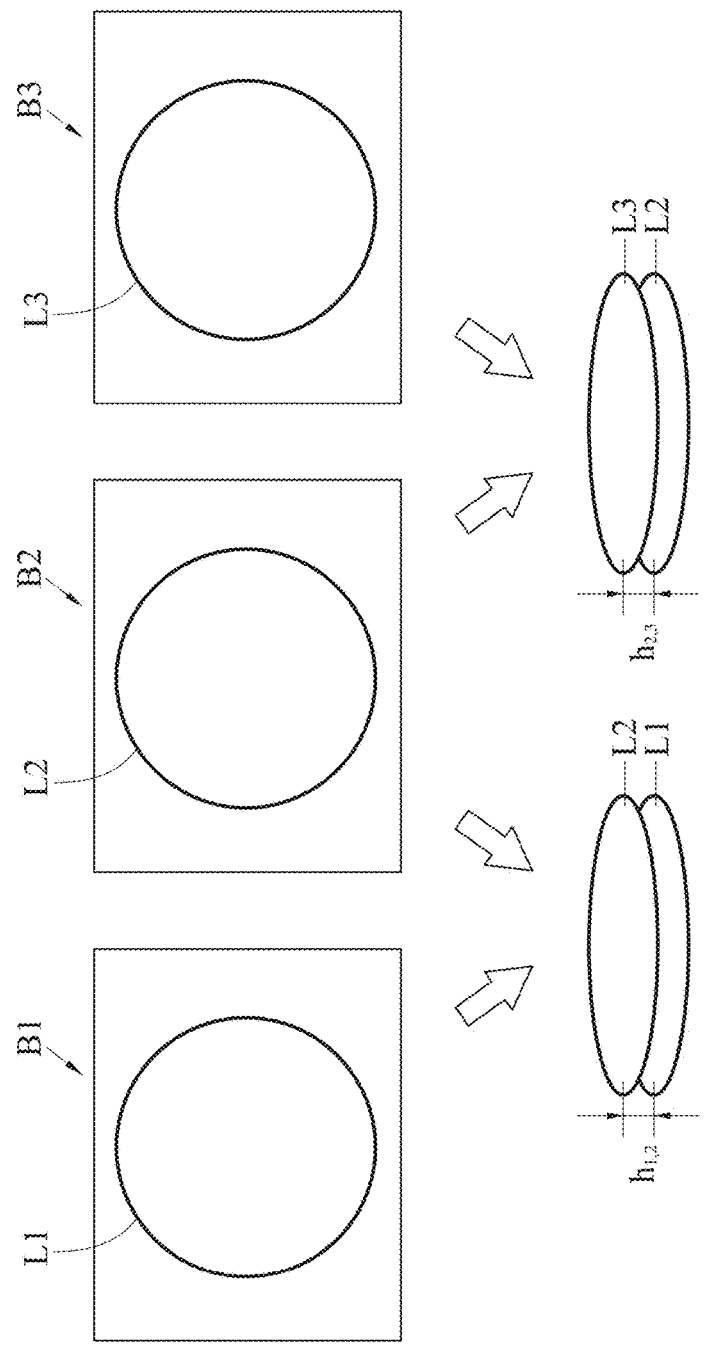

FIG. 4 is a schematic diagram showing application of the measuring system 1 having the structured light generating device 2 of the present disclosure to a 3D printing device 6. FIGS. 5A-5B, 6 and 7 are schematic diagrams showing measurement of height variation of the object 5 by the measuring system 1 having the structured light generating device 2 according to the present disclosure, wherein FIG. 5A is a partial view of FIG. 4; FIG. 5B is a partial view of FIG. 5A; and FIGS. 6 and 7 show different methods for calculating the height variation of the object 5.

Referring to FIGS. 4 to 7 and FIG. 1 or FIG. 2, the computing device 4 calculates the height variation of each layer of the object 5 according to the structured light image B captured by the image capturing device 3. The object 5 is a 3D object fabricated by the 3D printing device 6.

Referring to FIG. 4, the 3D printing device 6 has a 3D printing probe 61, a first lifting platform 62, a second lifting platform 63 and a powder spreading element 64. The 3D printing probe 61 has a laser 611 and a scanning mirror group 612 that generate a laser light beam E for processing or forming the object 5. In other embodiments, the 3D printing probe 61 is an extrusion-molding probe. The first lifting platform 62 can lift the object 5 and powder 65 in a processing area 66. The second lifting platform 63 can lift powder 65 in a holding area 67. The powder spreading element 64 can spread the powder 65 of the holding area 67 onto the processing area 66 and the measuring surface 51 of the object 5. The powder spreading element 64 can be a roller or a scraper.

Referring to FIGS. 5A, 5B and 6, the computing device 4 uses the structured light image B of the measuring layer of the object 5 as a measuring surface and uses the structured light image B of a previous measuring layer as a reference surface so as to calculate the height variation of the measuring layer according to the reference surface and the measuring surface.

In one embodiment, the structured light generating device 2 projects the superimposed structured light beam A5 on an initial surface (such as an upper surface) of the first lifting platform 62 and the image capturing device 3 captures the structured light image B of the initial surface of the first lifting platform 62.

Then, a first layer L1 of the object 5 is formed by the 3D printing device 6. The structured light generating device 2 projects the superimposed structured light beam A5 on the first layer L1 and the image capturing device 3 captures the structured light image B1 of the first layer L1. Further, the computing device 4 calculates the height difference between the first layer L1 (i.e., the measuring layer) and the initial surface of the first lifting platform 62 through a 3D algorithm so as to obtain the height variation of the first layer L1 (i.e., the measuring layer). The 3D algorithm can be a phase shifting method, a structured light spatial encoding method, a structured light time encoding method or a Fourier transform method.

Thereafter, a second layer L2 of the object 5 is formed by the 3D printing device 6. The structured light generating device 2 projects the superimposed structured light beam A5 on the second layer L2 and the image capturing device 3 captures the structured light image B2 of the second layer L2. Further, the computing device 4 uses the structured light image B2 of the second layer L2 (i.e., the measuring layer) as a measuring surface and uses the structured light image B1 of a previous measuring layer (i.e., the first layer L1) as a reference surface to thereby calculate the height difference $h_{1,2}$ between the second layer L2 (i.e., the measuring layer) and the first layer L1, and thus obtain the height variation of the second layer L2 (i.e., the measuring layer).

Subsequently, a third layer L3 of the object 5 is formed by the 3D printing device 6. The structured light generating device 2 projects the superimposed structured light beam A5 on the third layer L3 and the image capturing device 3 captures the structured light image B3 of the third layer L3. Further, the computing device 4 uses the structured light image B3 of the third layer L3 (i.e., the measuring layer) as a measuring surface and uses the structured light image B2 of a previous measuring layer (i.e., the second layer L2) as a reference surface to thereby calculate the height difference $h_{2,3}$ between the third layer L3 (i.e., the measuring layer) and the second layer L2, and thus obtain the height variation of the third layer L3 (i.e., the measuring layer).

In such a way, the height variation of each layer (from the first layer L1 to the $n^{th}$ layer Ln of the object 5) is obtained.

According to the above-described method (layer by layer), the structured light images B of a measuring layer and a previous measuring layer are used as a measuring surface and a reference surface, respectively, to thereby measure the height variation of the measuring layer. As such, if the object 5 has n layers, the image capturing device 3 needs to perform n+1 operations to capture n+1 structured light images B so as for the computing device 4 to calculate the height variation of each layer of the object 5. Compared with the prior art that needs 2n operations to capture images of n measuring surfaces and n reference surfaces, the present disclosure reduces the number of image capturing times and increases the computing speed.

Referring to FIG. 7, the computing device 4 calculates the height variation of each layer of the object 5 according to equation (1):

$$h_{m,m+1}(x,y) = h_{k,m+1}(x,y) - h_{k,m}(x,y) \qquad (1)$$

wherein $h_{m,m+1}$ represents the height difference between the structured light image Bm+1 of a $m+1^{th}$ layer of the object and the structured light image Bm of a $m^{th}$ layer of the object 5, m and k represent the $m^{th}$ layer and the $k^{th}$ layer of the object 5, respectively, and x and y represent x and y coordinates of the object, respectively.

For example, in the case of $h_{6,7}(x,y) = h_{1,7}(x,y) - h_{1,6}(x,y)$, it means that the height variation of the seventh layer L7 (m=6, m+1=7) of the object 5 is to be measured. The computing device 4 uses the structured light image B1 of the first layer L1 (k=1) of the object as a reference surface and subtracts the height difference $h_{1,6}$ between the structured light images B6 of the sixth layer L6 and the first layer L1 from the height difference $h_{1,7}$ between the structured light images B7 of the seventh layer L7 and the first layer L1 so as to obtain the height variation of the seventh layer L7 of the object 5.

Therefore, referring to FIG. 7, if the height difference between two adjacent layers of the object 5 is not significant, the equation (1) can be used to increase the distance between the measuring surface and the reference surface of the object so a to improve the resolution. Further, an interpolation or subtraction method is used to easily obtain the height variation of each layer of the object 5.

Figure 9B:
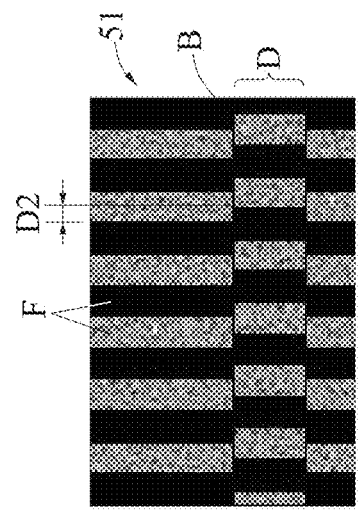
Figure 8:
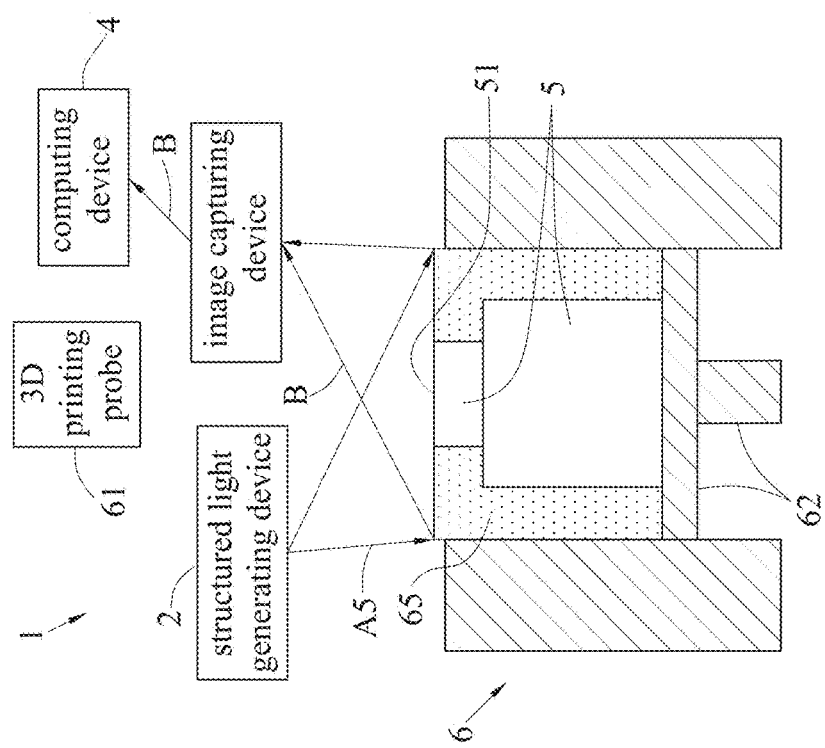

FIGS. 8, 9A and 9B are schematic diagrams showing measurement of flatness of the spread powder 65 on the object 5 by the measuring system 1 having the structured light generating device 2 according to the present disclosure, wherein FIG. 8 is a partial view of FIG. 4; and FIGS. 9A and 9B show different structured light images B presented by the superimposed structured light beam A5 on the object 5.

Referring to FIGS. 8, 9A and 9B and FIG. 4, the computing device 4 analyzes the flatness of the spread powder 65 on the measuring surface 51 of the object 5 according to the structured light image B of the image capturing device 3.

In one embodiment, the powder spreading element 64 of the 3D printing device 6 spreads powder 65 on the measuring surface 51 of the object 5. The structured light generating device 2 projects the superimposed structured light beam A5 on the powder 65, and the image capturing device 3 captures the structured light image B (for example, a 2D structured light image) presented by the superimposed structured light beam A5 on the powder 65. The computing device 4 calculates the displacement D2 of the structured light image B through a 2D algorithm so as to analyze the flatness of the spread powder 65.

Referring to FIGS. 9A and 9B, the structured light image B on the measuring surface 51 of the object 5 has a pattern of stripes F. Referring to FIG. 9A, if the stripes F have no displacement or have a displacement D2 (as shown in FIG. 9B) less than a threshold value, it can be determined that the spread powder 65 on the measuring surface 51 is flat, uniform or defect-free. On the other hand, referring to FIG. 9B, if the stripes F have a displacement D2 at a portion D and the displacement D2 is greater than the threshold value, it can be determined that the spread powder 65 on the measuring surface 51 is not flat (e.g., protrudes or recedes), not uniform or defective.

Therefore, compared with the prior art that analyzes the flatness of spread powder by using an image defect algorithm such as SVD or MIT and consequently requires a large number of data operations to obtain background image information and defective images, the present disclosure only needs to determine the displacement D2 of the pattern (such as stripes F) of the structured light image B so as to easily and quickly analyze the flatness of the spread powder 65.

Figure 10:
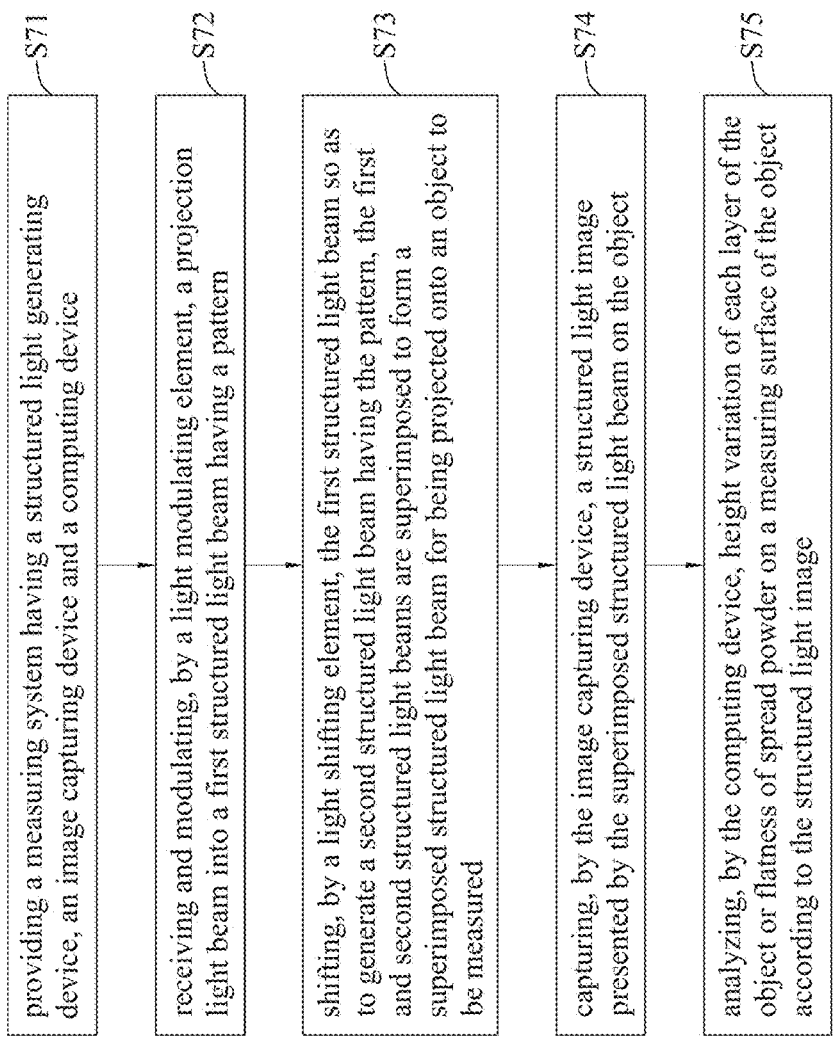
FIG. 10 is a schematic flow diagram showing a measuring method of the present disclosure.

FIG. 10 is schematic flow diagram showing a measuring method of the present disclosure.

Referring to FIG. 10 in combination with FIGS. 1 to 9B, at step S71, a measuring system having a structured light generating device 2, an image capturing device 3 and a computing device 4 is provided. The structured light generating device 2 has a light modulating element 24 and a corresponding light shifting element 25. The light modulating element 24 can be a DMD, an LCOS element or a grating. The light shifting element 25 can be a transparent plate or a glass plate of FIG. 1, a reflecting mirror of FIG. 2, or a double refracting crystal. Then, the process goes to step S72.

At step S72, the light modulating element 24 receives a projection light beam A2 and modulates the projection light beam A2 into a first structured light beam A3 having a pattern. Then, the process goes to step S73.

At step S73, the light shifting element 25 receives and shifts the first structured light beam A3 so as to generate a second structured light beam A4 having the pattern. A shift difference D1 is formed between the first structured light beam A3 and the second structured light beam A4, and the first structured light beam A3 and the second structured light beam A4 are superimposed to form a superimposed structured light beam A5 that is further projected on an object 5 to be measured. The pattern of the first structured light beam A3 and the second structured light beam A4 can be a pattern of stripes F (as shown in FIGS. 9A and 9B), a checkerboard pattern or a dot array pattern. Then, the process goes to step S74.

At step S74, the image capturing device 3 captures the structured light image B presented by the superimposed structured light beam A5 on the object 5. Then, the process goes to step S75.

At step S75, the computing device 4 analyzes height variation of each layer of the object 5 or flatness of spread powder 65 on a measuring surface 51 of the object 5 according to the structured light image B captured by the image capturing device 3. The object 5 is a 3D object fabricated by a 3D printing device 6.

Said analyzing height variation of each layer of the object 5 (layer by layer) includes: the computing device 4 calculating height variation of the measuring layer according to a reference subject and a measuring subject by using a structured light image of a measuring layer of the object 5 as the measuring subject and using a structured light image of a previous measuring layer of the object 5 as the reference subject.

In addition, said analyzing height variation of each layer of the object 5 (cross layer) can be performed according to the equation:

$$h_{m,m+1}(x,y) = h_{k,m+1}(x,y) - h_{k,m}(x,y)$$

wherein $h_{m,m+1}$ represents the height difference between the structured light image B m+1 of a m+1$^{th}$ layer of the object 5 and the structured light image Bm of a m$^{th}$ layer of the object 5, m and k represent the m$^{th}$ layer and the k$^{th}$ layer of the object 5, respectively, and x and y represent x and y coordinates of the object 5, respectively.

Said analyzing flatness of spread powder 65 on a measuring surface 51 of the object 5 includes: a powder spreading element 64 of the 3D printing device 6 spreading powder 65 on the measuring surface 51 of the object 5; the structured light generating device 2 projecting the superimposed structured light beam A5 on the powder 65; the image capturing device 3 capturing the structured light image B of the superimposed structured light beam A5 on the powder 65; and the computing device 4 calculating displacement D2 of the structured light image B so as to determine the flatness of the spread powder 65.

According to the present disclosure, a light modulating element modulates a projection light beam into a first structured light beam having a pattern, and a light shifting element shifts the first structured light beam to generate a second structured light beam having the pattern, wherein the first structured light beam and the second structured light beam are superimposed to form a superimposed structured light beam, thereby improving the resolution.

Further, the structured light generating device of the present disclosure can be used to measure an object (e.g., a 3D object) fabricated by a 3D printing device. In one embodiment, height variation of each layer of the object or flatness of spread powder on the object can be analyzed through the superimposed structured light beam so as to improve the quality and yield of the object.

The above-described descriptions of the detailed embodiments are only to illustrate the preferred implementation according to the present disclosure, and it is not to limit the scope of the present disclosure. Accordingly, all modifications and variations completed by those with ordinary skill in the art should fall within the scope of the present disclosure defined by the appended claims.

What is claimed is:

1. A structured light generating device, comprising:
a light modulating element configured to receive a projection light beam and modulate the projection light beam into a first structured light beam having a pattern; and
a light shifting element corresponding to the light modulating element and configured to receive and shift the first structured light beam to generate a second structured light beam having the pattern, wherein an incident surface or a reflecting surface of the light shifting element is not perpendicular to the first structured light beam from the light modulating element, an angle less than 30 degrees is formed between the first structured light beam and the second structured light beam inside the light shifting element or on the reflecting surface of the light shifting element, a shift difference exists between the first structured light beam and the second structured light beam, and the first structured light beam and the second structured light beam both having a same pattern are superimposed according to the shift difference to form a superimposed structured light beam.

2. The structured light generating device of claim 1, wherein the light modulating element is a digital micromirror device (DMD), a liquid crystal on silicon (LCOS) element or a grating; the light shifting element is a transparent plate, a reflecting mirror or a double refracting crystal; the first structured light beam, the second structured light beam and the superimposed structured light beam are digital structured light beams; and the pattern is a stripe pattern, a checkerboard pattern or a dot array pattern.

3. The structured light generating device of claim 1, further comprising a light emitting element and a light uniformizing module corresponding to the light emitting element, wherein the light emitting element is configured to emit a light beam and the light uniformizing module is configured to uniformly transform the light beam into the projection light beam.

4. The structured light generating device of claim 3, further comprising a beam splitter corresponding to the light uniformizing module and positioned between the light modulating element and the light shifting element, wherein the beam splitter is configured to receive the projection light beam from the light uniformizing module and reflect the projection light beam into the light modulating element.

5. The structured light generating device of claim 1, further comprising a focusing lens group corresponding to the light shifting element and configured to focus the superimposed structured light beam onto an object to be measured.

6. The structured light generating device of claim 3, further comprising a beam splitter positioned between the light modulating element and the light shifting element, wherein the first structured light beam from the light modulating element transmits through the beam splitter and reaches the light shifting element, and the light shifting element shifts the first structured light beam to generate the second structured light beam.

7. The structured light generating device of claim 6, further comprising a reflecting mirror corresponding to the beam splitter and configured to receive the first structured light beam from the beam splitter and reflect the first structured light beam.

8. The structured light generating device of claim 6, further comprising a focusing lens group corresponding to the beam splitter and configured to focus the superimposed structured light beam from the beam splitter onto an object to be measured.

9. A measuring system, comprising:
a structured light generating device, comprising:
a light modulating element configured to receive a projection light beam and modulate the projection light beam into a first structured light beam having a pattern; and
a light shifting element corresponding to the light modulating element and configured to receive and shift the first structured light beam to generate a second structured light beam having the pattern, wherein an incident surface or a reflecting surface of the light shifting element is not perpendicular to the first structured light beam from the light modulating element, an angle less than 30 degrees is formed between the first structured light beam and the second structured light beam inside the light shifting element or on the reflecting surface of the light shifting element, a shift difference exists between the first structured light beam and the second structured light beam, and the first structured light beam and the second structured light beam both having a same pattern are superimposed according to the shift difference to form a superimposed structured light beam for being projected onto an object to be measured; and an image capturing device configured to capture a structured light image presented by the superimposed structured light beam on the object.

10. The measuring system of claim 9, wherein the image capturing device has a lens group and a corresponding sensing element and is configured to capture the structured light image.

11. The measuring system of claim 9, further comprising a computing device configured to calculate height variation of each layer of the object or flatness of spread powder on a measuring surface of the object according to the structured light image captured by the image capturing device, wherein the object is a 3D object fabricated by a 3D printing device.

12. The measuring system of claim 11, wherein the computing device is configured to calculate height variation of a measuring layer of the object according to a reference subject and a measuring subject by using a structured light image of the measuring layer of the object as the measuring subject and using a structured light image of a previous measuring layer of the object as the reference subject.

13. The measuring system of claim 11, wherein the computing device calculates the height variation of each layer of the object according to the equation:

$$h_{m,m+1}(x,y)=h_{k,m+1}(x,y)-h_{k,m}(x,y)$$

wherein $h_{m,m+1}$ represents a height difference between a structured light image of a m+1$^{th}$ layer of the object and a structured light image of a m$^{th}$ layer of the object, m and k represent the m$^{th}$ layer and the k$^{th}$ layer of the object, respectively, and x and y represent x and y coordinates of the object, respectively.

14. The measuring system of claim 11, wherein a powder spreading element of the 3D printing device spreads powder on the measuring surface of the object, the structured light generating device projects the superimposed structured light beam onto the powder, the image capturing device captures a structured light image of the superimposed structured light beam on the powder, and the computing device calculates displacement in the structured light image to determine the flatness of the spread powder.

15. A measuring method, comprising:
providing a measuring system comprising a structured light generating device and an image capturing device, wherein the structured light generating device has a light modulating element and a corresponding light shifting element;
receiving and modulating, by the light modulating element, a projection light beam into a first structured light beam having a pattern;
receiving and shifting, by the light shifting element, the first structured light beam to generate a second structured light beam having the pattern, wherein an incident surface or a reflecting surface of the light shifting element is not perpendicular to the first structured light beam from the light modulating element, an angle less than 30 degrees is formed between the first structured light beam and the second structured light beam inside the light shifting element or on the reflecting surface of the light shifting element, a shift difference exists between the first structured light beam and the second structured light beam, and the first structured light beam and the second structured light beam both having a same pattern are superimposed according to the shift difference to form a superimposed structured light beam for being projected onto an object to be measured; and
capturing, by the image capturing device, a structured light image presented by the superimposed structured light beam on the object.

16. The measuring method of claim 15, wherein the measuring system further comprises a computing device and the object is a 3D object fabricated by a 3D printing device, the measuring method further comprising:
analyzing, by the computing device, height variation of each layer of the object or flatness of spread powder on a measuring surface of the object according to the structured light image captured by the image capturing device.

17. The measuring method of claim 16, wherein analyzing height variation of each layer of the object comprises:
calculating, by the computing device, height variation of a measuring layer of the object according to a reference subject and a measuring subject by using a structured light image of the measuring layer of the object as the measuring subject and using a structured light image of a previous measuring layer of the object as the reference subject.

18. The measuring method of claim 16, wherein analyzing height variation of each layer of the object is performed according to the equation:

$$h_{m,m+1}(x,y)=h_{k,m+1}(x,y)-h_{k,m}(x,y)$$

wherein $h_{m,m+1}$ represents a height difference between a structured light image of a m+1$^{th}$ layer of the object and a structured light image of a m$^{th}$ layer of the object, m and k represent the m$^{th}$ layer and the k$^{th}$ layer of the object, respectively, and x and y represent x and y coordinates of the object, respectively.

19. The measuring method of claim 16, wherein analyzing flatness of spread powder on a measuring surface of the object comprises:
spreading, by a powder spreading element of the 3D printing device, powder on the measuring surface of the object;
projecting, by the structured light generating device, the superimposed structured light beam on the powder;
capturing, by the image capturing device, a structured light image of the superimposed structured light beam on the powder; and
calculating, by the computing device, displacement in the structured light image to determine the flatness of the spread powder.

* * * * *